(12) United States Patent
Liu et al.

(10) Patent No.: US 10,814,357 B2
(45) Date of Patent: Oct. 27, 2020

(54) IMMERSED WHEEL CLEANING DEVICE

(71) Applicant: CITIC Dicastal CO., LTD., Qinhuangdao, Hebei (CN)

(72) Inventors: Huiying Liu, Qinhuangdao (CN); Yuexin Lu, Qinhuangdao (CN)

(73) Assignee: CITIC Dicastal CO., LTD., Qinhuangdao (CN)

(*) Notice: Subject to any disclaimer, the term of this patent is extended or adjusted under 35 U.S.C. 154(b) by 279 days.

(21) Appl. No.: 15/894,048

(22) Filed: Feb. 12, 2018

(65) Prior Publication Data

US 2019/0201941 A1    Jul. 4, 2019

(30) Foreign Application Priority Data

Dec. 29, 2017  (CN) .......................... 2017 1 1468977

(51) Int. Cl.
*B08B 3/04* (2006.01)
*B23Q 11/00* (2006.01)
*B60S 3/04* (2006.01)
*B23Q 39/04* (2006.01)
*B08B 3/10* (2006.01)

(52) U.S. Cl.
CPC .......... *B08B 3/041* (2013.01); *B23Q 11/0075* (2013.01); *B08B 3/044* (2013.01); *B08B 3/10* (2013.01); *B23Q 39/044* (2013.01); *B60S 3/042* (2013.01)

(58) Field of Classification Search
CPC ..... B21Q 11/004; B21Q 11/0075; B08B 3/04; B08B 3/044; B08B 9/0826; B08B 9/22; B08B 9/44; B60S 3/042; B23Q 39/028; B23Q 39/044; B23Q 39/046; B23Q 11/0042; B23Q 11/0075

USPC ................................ 134/153, 157, 149, 161
See application file for complete search history.

(56) References Cited

U.S. PATENT DOCUMENTS

| 2,319,501 | A | * | 5/1943 | Gora | G01M 3/2876 |
| | | | | | 73/48 |
| 5,653,247 | A | * | 8/1997 | Murakami | B08B 3/02 |
| | | | | | 134/102.3 |
| 2003/0209260 | A1 | * | 11/2003 | Ching | H01L 21/67313 |
| | | | | | 134/32 |
| 2008/0191119 | A1 | * | 8/2008 | Coma | B23P 21/006 |
| | | | | | 248/639 |
| 2016/0001335 | A1 | * | 1/2016 | Forster | B25J 21/00 |
| | | | | | 134/26 |
| 2017/0182543 | A1 | * | 6/2017 | Xue | B21D 22/18 |
| 2017/0182619 | A1 | * | 6/2017 | Xue | B24B 9/04 |

FOREIGN PATENT DOCUMENTS

CN       104138872 A   * 11/2014
CN       109107988 A   *  1/2019

* cited by examiner

*Primary Examiner* — Joseph L. Perrin
*Assistant Examiner* — Kevin G Lee
(74) *Attorney, Agent, or Firm* — Cooper Legal Group, LLC

(57) ABSTRACT

An immersed wheel cleaning device is composed of a wheel feeding system, a wheel cleaning system and a wheel discharging and blowing system. Cleaning and blowing of each wheel comprise four steps: step 1, feeding and clamping; step 2, primary cleaning; step 3, secondary cleaning; and step 4, blowing and discharging. Ordered engagement of discharging and feeding is realized by cyclic switching of manipulators, and the steps are engaged, so that the cycle time is greatly reduced.

2 Claims, 7 Drawing Sheets

IMMERSED WHEEL CLEANING DEVICE

CROSS-REFERENCE TO RELATED APPLICATIONS

This application is filed based upon and claims priority to Chinese Patent Application No. 201711468977.6, filed on Dec. 29, 2017, the contents of which are hereby incorporated by reference in its entirety.

BACKGROUND

After a wheel is machined, it needs to clean chips and emulsion remaining on the surface of the wheel. At present, cleaning equipment for a production line is often simple and low in cycle time and cannot clean the wheel thoroughly in all directions, and the remaining aluminum chips may influence subsequent machining and detection, so new automatic equipment must be developed. Based on the current situation, the disclosure provides an immersed wheel cleaning device, in which a wheel is immersed into water and cleaned in all directions, and the wheel is in a rotating state all the time during cleaning, so that the wheel is cleaned more uniformly, secondary cleaning can be realized, the cycle time is short and the efficiency is high.

SUMMARY

The disclosure relates to the technical field of cleaning, and specifically, to a wheel aluminum chip and cutting fluid cleaning device.

An immersed wheel cleaning device is provided, which can be used for automatic continuous production, in which a wheel is immersed into water and cleaned in all directions, and the wheel is in a rotating state all the time during cleaning, so that the wheel is cleaned more uniformly; and by skilful design, the cleaning cycle time is guaranteed, the cleaning time is prolonged, secondary cleaning can be realized for each wheel, and the cleaning quality and the cleaning efficiency are improved.

In some embodiments of the disclosure, an immersed wheel cleaning device is composed of a frame, a sleeve, a servo motor, a bearing seat, a shaft, a bearing, a rotating disk, a servo motor I, a servo motor II, a left support frame, a jacking cylinder I, a guide post, a lifting round table I, a positioning support plate, a guide rail, a gear rack, a left sliding plate, positioning wheels, a clamping cylinder, a right sliding plate, an L-shaped tumbler I, a manipulator I, waterproof motors, clamping wheels, an L-shaped tumbler II, a manipulator II, a right support frame, a jacking cylinder II, a support platform, a lower air compressor, a lifting round table II, an upper air compressor and an air outlet.

The immersed wheel cleaning device is composed of three systems: a wheel feeding system, which completes positioning and jacking of a wheel; a wheel cleaning system, which completes the entry of the wheel into water, the cleaning of the wheel, the coming-out of the wheel of water and station switching; and a wheel discharging and blowing system, which blows and transfers the cleaned wheel.

The positioning support plate is fixed on the left side of the frame, the guide rail is mounted on the positioning support plate, the left sliding plate and the right sliding plate are symmetrically mounted on the guide rail and connected with each other via the gear rack, the four positioning wheels are respectively mounted on the left sliding plate and the right sliding plate, and the output end of the clamping cylinder is connected with the right sliding plate. When the clamping cylinder drives the right sliding plate to move, the left sliding plate and the right sliding plate move synchronously under the action of the gear rack, and the four positioning wheels can position the wheel. The left support frame is mounted below the positioning support plate, the jacking cylinder I is mounted on the left support frame, and the output end of the cylinder is connected with the lifting round table I to control the ascent and descent of the lifting round table I under the guidance of the guide post. After the wheel is positioned on a roller bed, the positioning wheels are reset, the jacking cylinder I drives the lifting round table I to ascend to jack the wheel up certain height, the ascending wheel can be clamped by the manipulator, and after the wheel is clamped by the manipulator, the lifting round table I descends and is reset. This is the wheel feeding system, which completes positioning and jacking of the wheel.

The sleeve is fixed in the center of the bottom of the frame, and the sleeve and the frame form an annular closed space which is filled with clear water for cleaning the wheel. The servo motor is mounted inside the sleeve, the rotating disk is mounted at the output end of the motor, and the servo motor controls the rotation of the rotating disk. The servo motor I and the servo motor II are symmetrically mounted on the rotating disk, the L-shaped tumbler I is mounted at the output end of the servo motor I, the manipulator I is mounted on the L-shaped tumbler I, the left holding arm and the right holding arm of the manipulator I are respectively provided with two waterproof motors, a clamping wheel is mounted at the output end of each motor, the jacked wheel can be clamped via the manipulator I, the waterproof motors drive the clamping wheels to rotate, and the wheel can be driven to rotate; the L-shaped tumbler II is mounted at the output end of the servo motor II, the manipulator II is mounted on the L-shaped tumbler II, the L-shaped tumbler I and the L-shaped tumbler II are same in structure, and the manipulator I and the manipulator II are same in structure. In the initial state, the manipulator I is located above a feeding roller bed, and the manipulator II is located in water. The servo motor I drives the L-shaped tumbler I to rotate 180°, the wheel clamped by the manipulator I can be immersed into water, thus, the wheel enters the water, meanwhile, the servo motor II drives the L-shaped tumbler II to rotate 180°, the wheel clamped by the manipulator II can be switched to a position above a discharging roller bed, thus, the wheel comes out of the water. The servo motor drives the rotating disk to rotate 180°, the wheel clamped by the manipulator I is switched from a left cleaning station to a right cleaning station to realize secondary cleaning, and after the manipulator II releases the wheel on the discharging roller bed, the wheel is switched from a discharging station to a feeding station, so that ordered engagement of discharging and feeding is realized. When the wheel is cleaned at the left cleaning station and the right cleaning station, the waterproof motors drive the clamping wheels to rotate, so that the wheel can rotate all the time, wherein the wheel rotating directions at the left cleaning station and the right cleaning station can be set to be opposite. This is the wheel cleaning system, which completes the entry of the wheel into water, the cleaning of the wheel, the coming-out of the wheel of water and station switching.

The right support frame is fixed on the right side of the frame, the jacking cylinder II is mounted on the right support frame, the jacking cylinder II controls the up and down movements of the support platform under the guidance of a guide post, the lifting round table II is mounted on the support platform, the lower air compressor is mounted below the lifting round table II, the output end of the lower air compressor is connected with an air flue arranged on the lifting round table II, and air is blown to the back cavity of the wheel via the air outlet on the upper surface of the lifting round table II. The air outlet is arranged above the discharging roller bed, and the upper air compressor provides compressed air for the air outlet to blow the front of the wheel. When the wheel clamped by the manipulator is switched to the position above the discharging roller bed, the upper air compressor and the lower air compressor work simultaneously to blow the front and the back cavity of the wheel respectively, next, the jacking cylinder II drives the lifting round table II to ascend, when the lifting round table II is in contact with the flange face of the wheel, the manipulator releases the wheel, the wheel falls onto the lifting round table II, then the jacking cylinder II drives the lifting round table II to descend, the wheel falls onto the discharging roller bed, and the roller bed rotates to transfer the wheel down. This is the wheel discharging and blowing system, which blows and transfers the cleaned wheel.

Cleaning and blowing of each wheel comprise four steps: step, feeding and clamping; step, primary cleaning; step, secondary cleaning; and step, blowing and discharging.

The working process of the immersed wheel cleaning device is: in the initial state, the manipulator I is located above the feeding roller bed, and the manipulator II is located in water. Firstly, the wheel is positioned on the feeding roller bed by the positioning wheels, then the positioning wheels are reset, the jacking cylinder I drives the lifting round table I to ascend to jack the wheel up certain height, the ascending wheel is clamped by the manipulator I, and after the wheel is clamped by the manipulator, the lifting round table I descends and is reset, and this is step. Next, the servo motor I drives the L-shaped tumbler I to rotate 180°, the wheel clamped by the manipulator I is immersed into water and cleaned, the waterproof motors drive the wheel to rotate all the time during cleaning, meanwhile, the servo motor II drives the L-shaped tumbler II to rotate 180°, the unloaded manipulator II is switched to a position above the discharging roller bed, and this is step. Then, the servo motor drives the rotating disk to rotate 180°, the wheel clamped by the manipulator I is switched from the left cleaning station to the right cleaning station to accept secondary cleaning, the manipulator II is switched from the discharging station to the feeding station to clamp next wheel to be cleaned, and this is step. Next, the servo motor I drives the L-shaped tumbler I to rotate 180° again, the wheel clamped by the manipulator I is switched to a position above the discharging roller bed, blown and discharged, the waterproof motors drive the wheel to rotate all the time during blowing, meanwhile, the servo motor II drives the L-shaped tumbler II to rotate 180° again, the to-be-cleaned wheel clamped by the manipulator II is immersed into water and cleaned, and this is step. So far, cleaning and blowing of the first wheel are completed via the four steps, the second wheel also completes step and step, and the device enters a stable full-load circulating state; ordered engagement of discharging and feeding is realized by cyclic switching of the manipulators; the steps are engaged, so that the cycle time is greatly reduced; and although cleaning and blowing of each wheel comprise four steps, when the device works continuously, the cycle time is just the sum of feeding and discharging time.

The device can be used for automatic continuous production; the wheel is immersed into water for cleaning in all directions, and the wheel rotates all the time during cleaning, so that the wheel is cleaned more uniformly, secondary cleaning of the wheel is realized, the cleaning time is prolonged, the cleaning quality is improved, the cycle time is shortened, and the production efficiency is improved; and the device is novel in structure and skilful in design, and guarantees the quality and the efficiency.

Figure 1:
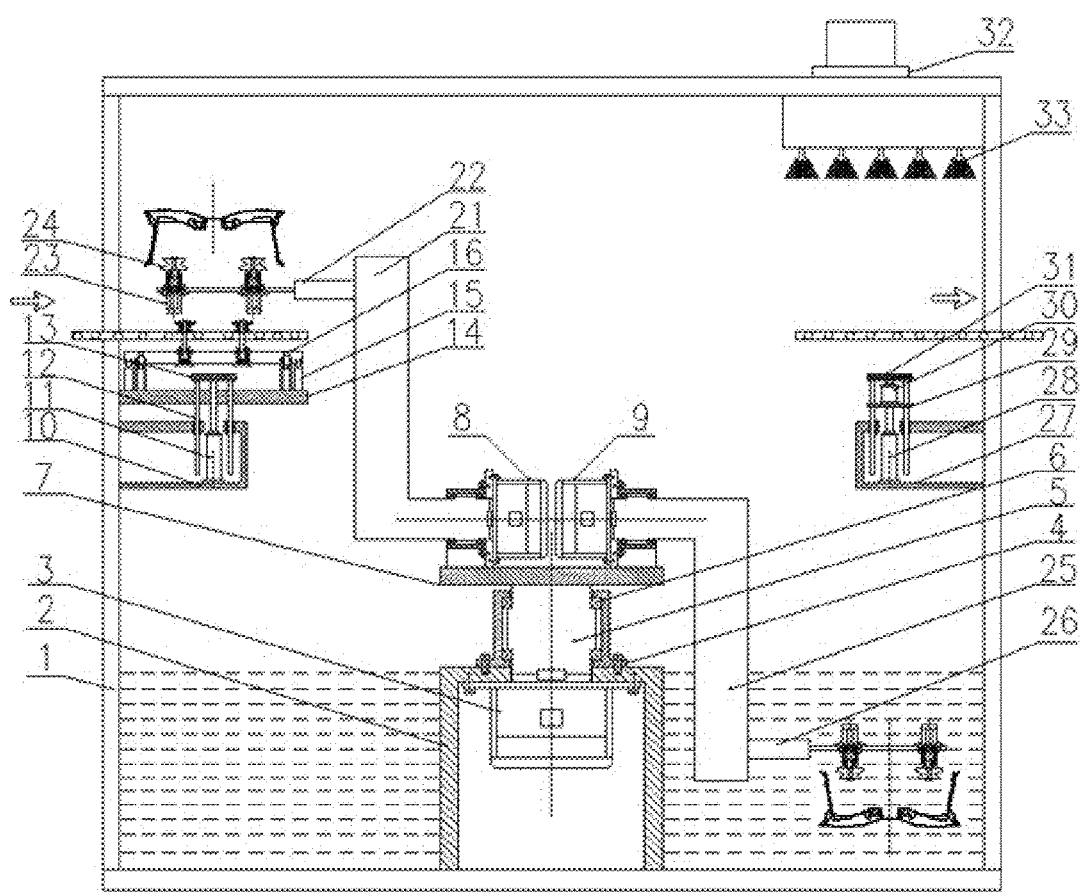
FIG. 1 is a front view of the immersed wheel cleaning device of the disclosure.
Figure 2:
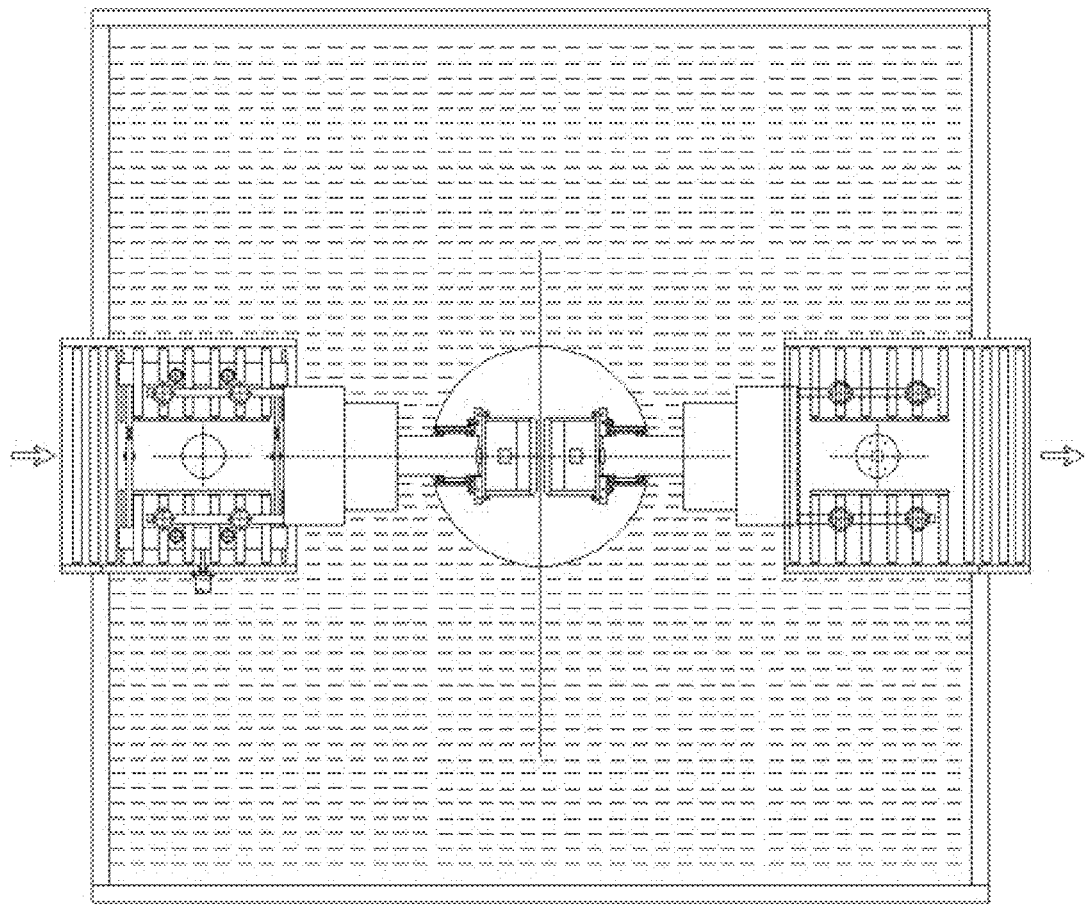
FIG. 2 is a top view of the immersed wheel cleaning device of the disclosure.
Figure 3:
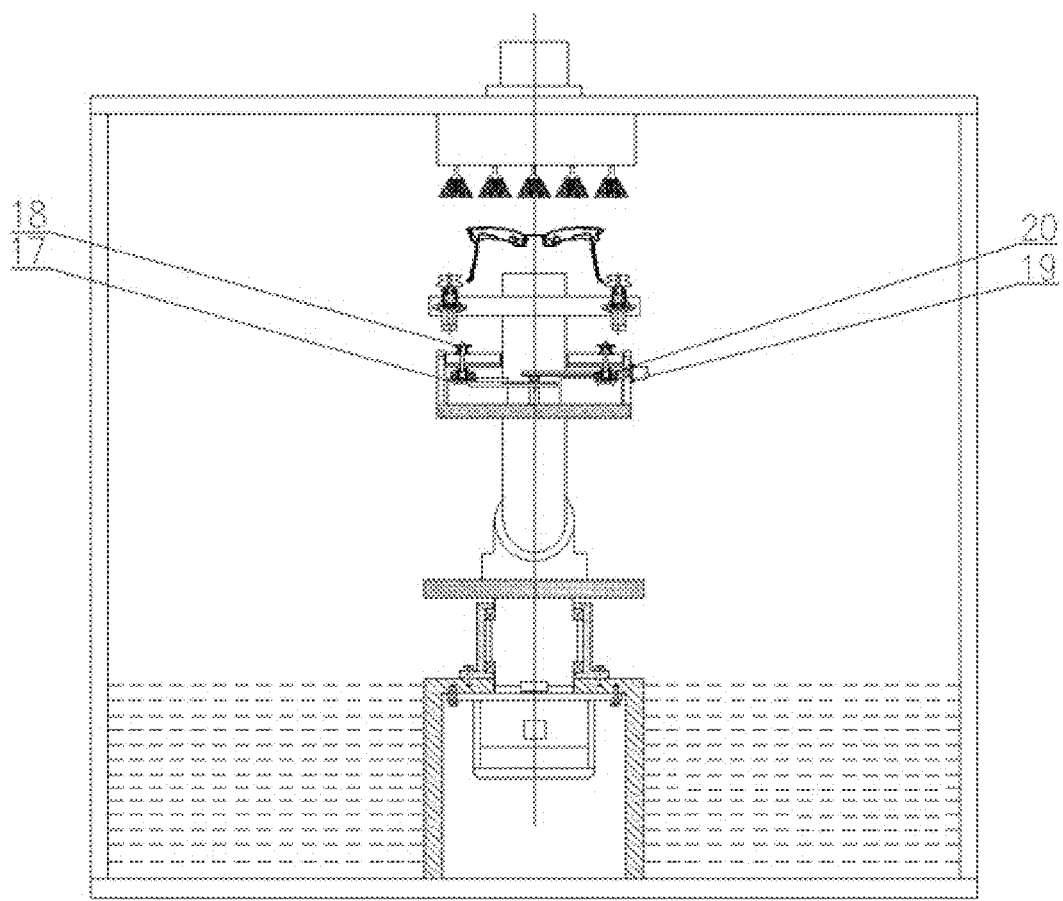
FIG. 3 is a left view of the immersed wheel cleaning device of the disclosure.
Figure 4:
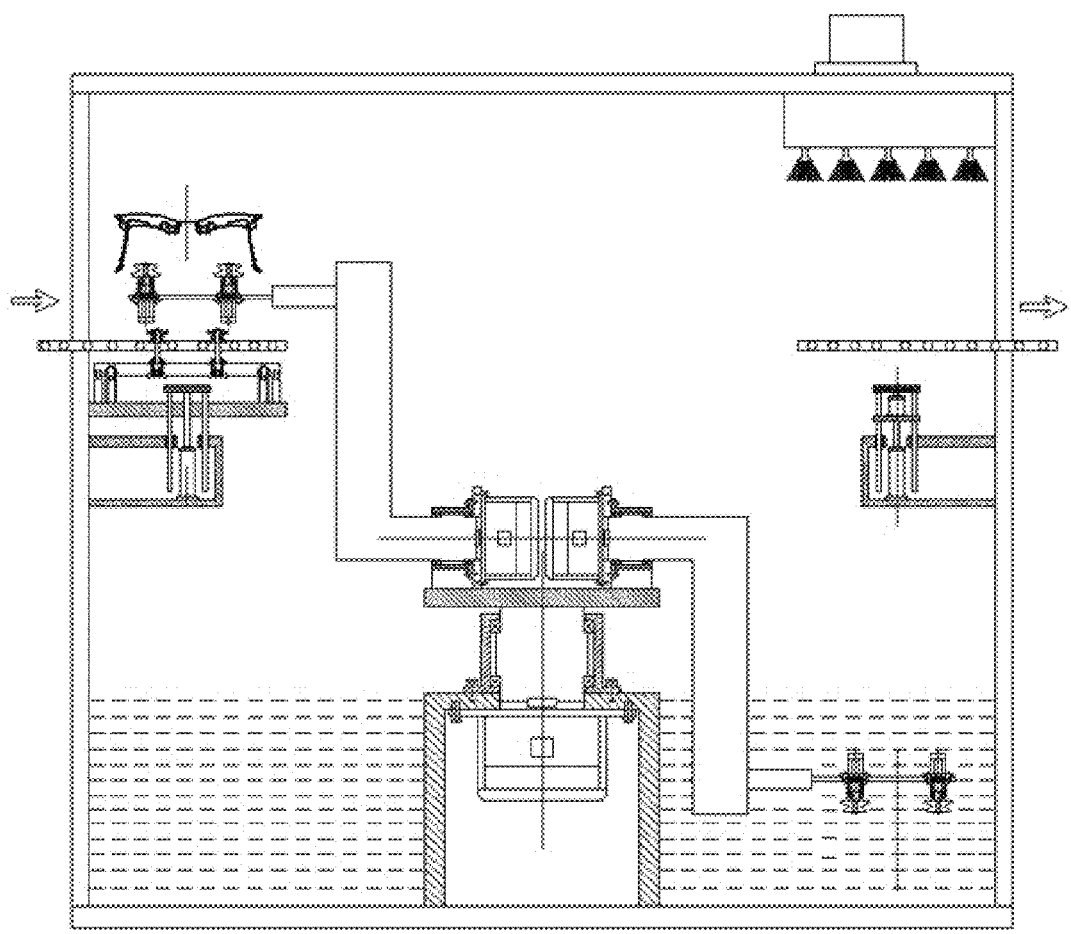
FIG. 4 is a schematic diagram of step 1 when the immersed wheel cleaning device of the disclosure works.
Figure 5:
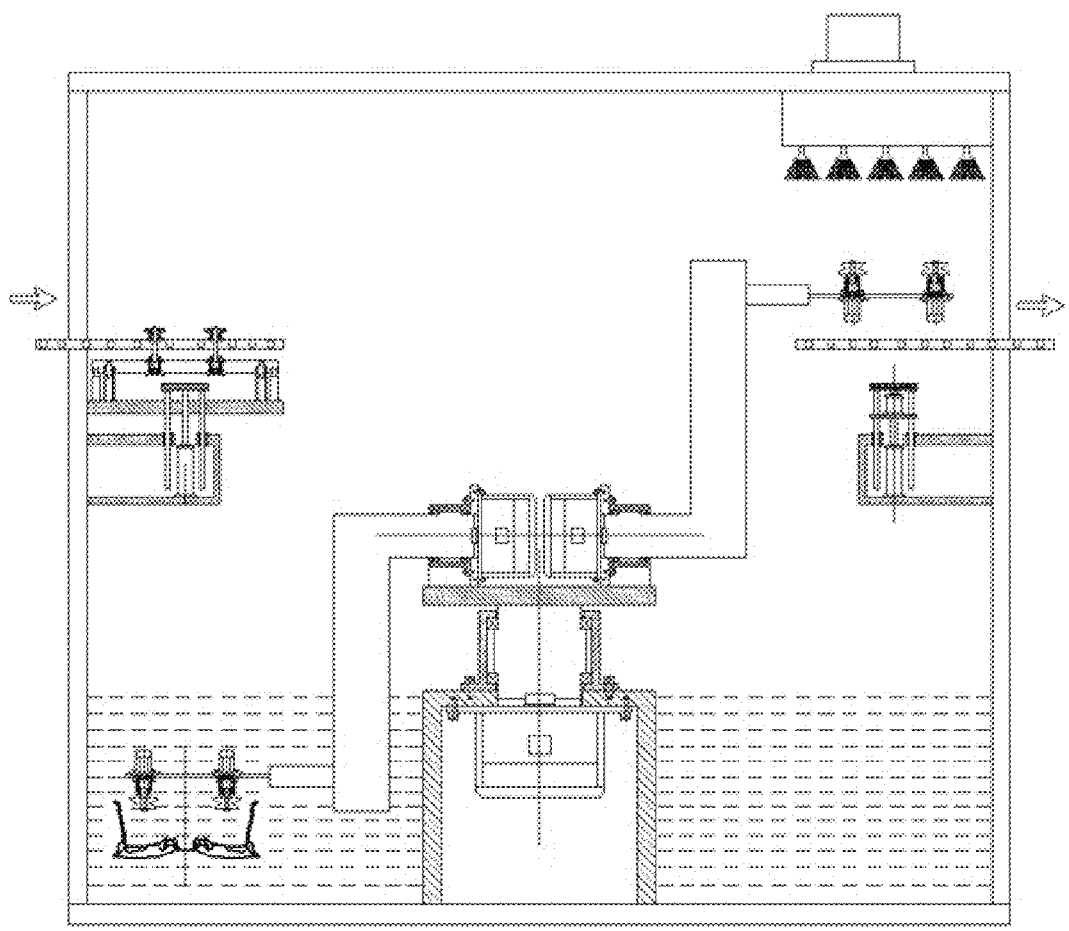
FIG. 5 is a schematic diagram of step 2 when the immersed wheel cleaning device of the disclosure works.
Figure 6:
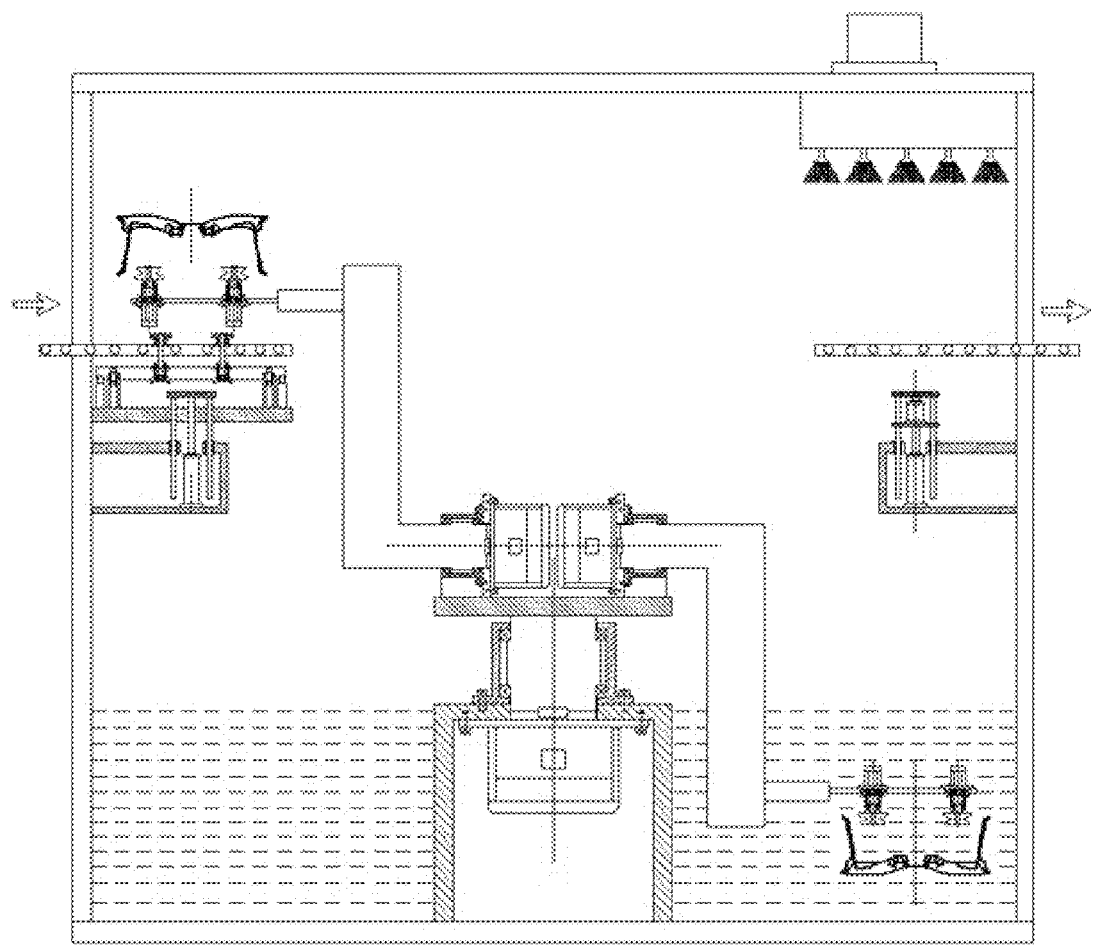
FIG. 6 is a schematic diagram of step 3 when the immersed wheel cleaning device of the disclosure works.
Figure 7:
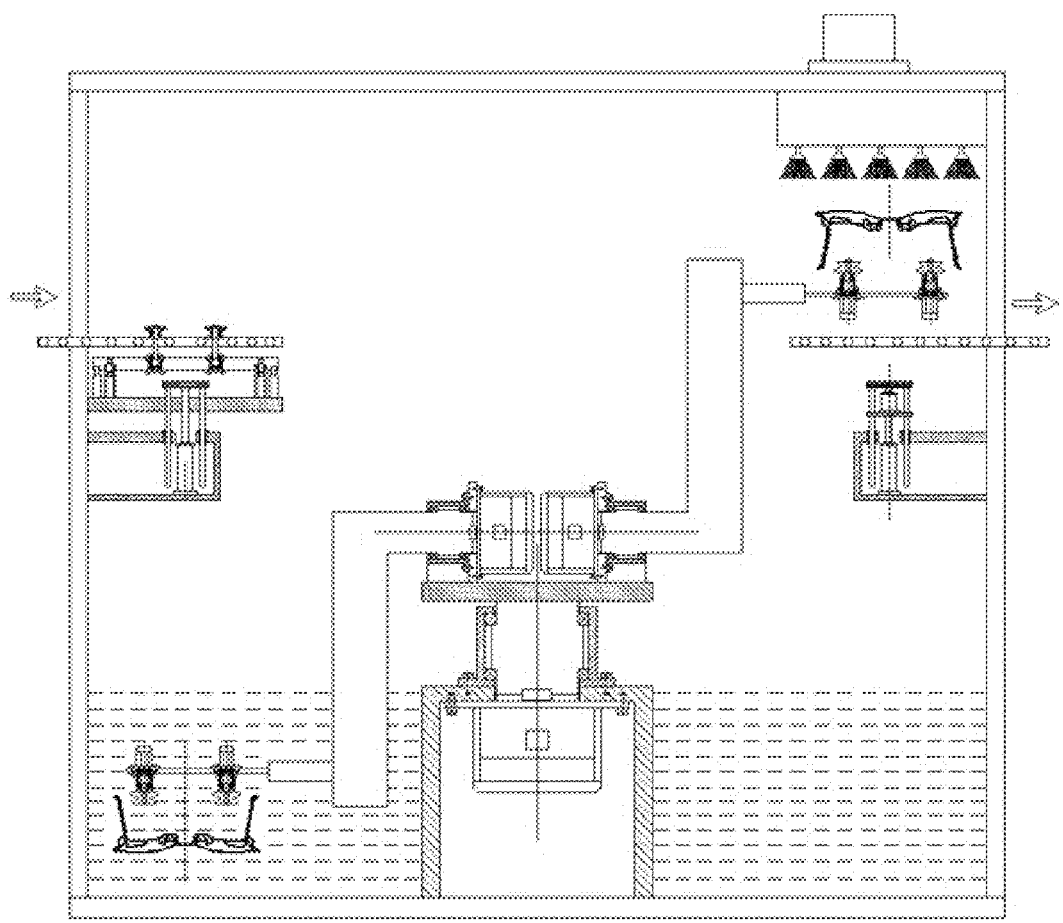
FIG. 7 is a schematic diagram of step 4 when the immersed wheel cleaning device of the disclosure works.

In which, 1—frame, 2—sleeve, 3—servo motor, 4—bearing seat, 5—shaft, 6—bearing, 7—rotating disk, 8—servo motor I, 9—servo motor II, 10—left support frame, 11—jacking cylinder I, 12—guide post, 13—lifting round table I, 14—positioning support plate, 15—guide rail, 16—gear rack, 17—left sliding plate, 18—positioning wheel, 19—clamping cylinder, 20—right sliding plate, 21—L—shaped tumbler I, 22—manipulator I, 23—waterproof motor, 24—clamping wheel, 25—L-shaped tumbler II, 26—manipulator II, 27—right support frame, 28—jacking cylinder II, 29—support platform, 30—lower air compressor, 31—jacking round table II, 32—upper air compressor, 33—air outlet.

DETAILED DESCRIPTION

Specific details and working conditions of a device provided by the disclosure will be given below in combination with the accompanying drawings.

An immersed wheel cleaning device is composed of a frame 1, a sleeve 2, a servo motor 3, a bearing seat 4, a shaft 5, a bearing 6, a rotating disk 7, a servo motor I 8, a servo motor II 9, a left support frame 10, a jacking cylinder I 11, a guide post 12, a lifting round table I 13, a positioning support plate 14, a guide rail 15, a gear rack 16, a left sliding plate 17, positioning wheels 18, a clamping cylinder 19, a right sliding plate 20, an L-shaped tumbler I 21, a manipulator I 22, waterproof motors 23, clamping wheels 24, an L-shaped tumbler II 25, a manipulator II 26, a right support frame 27, a jacking cylinder II 28, a support platform 29, a lower air compressor 30, a lifting round table II 31, an upper air compressor 32 and an air outlet 33.

The immersed wheel cleaning device is composed of three systems: a wheel feeding system, which completes positioning and jacking of a wheel; a wheel cleaning system, which completes the entry of the wheel into water, the cleaning of the wheel, the coming-out of the wheel of water and station switching; and a wheel discharging and blowing system, which blows and transfers the cleaned wheel.

The positioning support plate 14 is fixed on the left side of the frame 1, the guide rail 15 is mounted on the positioning support plate 14, the left sliding plate 17 and the right sliding plate 20 are symmetrically mounted on the guide rail 15 and connected with each other via the gear rack 16, the four positioning wheels 18 are respectively mounted on the left sliding plate 17 and the right sliding plate 20, and the output end of the clamping cylinder 19 is connected with the right sliding plate 20. When the clamping cylinder 19 drives the right sliding plate 20 to move, the left sliding plate 17 and the right sliding plate 20 move synchronously under the action of the gear rack 16, and the four positioning wheels 18 can position the wheel. The left support frame 10 is mounted below the positioning support plate 14, the jacking cylinder I 11 is mounted on the left support frame 10, and the output end of the cylinder is connected with the lifting round table I 13 to control the ascent and descent of the lifting round table I 13 under the guidance of the guide post 12. After the wheel is positioned on a roller bed, the positioning wheels 18 are reset, the jacking cylinder I 11 drives the lifting round table I 13 to ascend to jack the wheel up certain height, the ascending wheel can be clamped by the manipulator, and after the wheel is clamped by the manipulator, the lifting round table I 13 descends and is reset. This is the wheel feeding system, which completes positioning and jacking of the wheel.

The sleeve 2 is fixed in the center of the bottom of the frame 1, and the sleeve 2 and the frame 1 form an annular closed space which is filled with clear water for cleaning the wheel. The servo motor 3 is mounted inside the sleeve 2, the rotating disk 7 is mounted at the output end of the motor, and the servo motor 3 controls the rotation of the rotating disk 7. The servo motor I 8 and the servo motor II 9 are symmetrically mounted on the rotating disk 7, the L-shaped tumbler I 21 is mounted at the output end of the servo motor I 8, the manipulator I 22 is mounted on the L-shaped tumbler I 21, the left holding arm and the right holding arm of the manipulator I 22 are respectively provided with two waterproof motors 23, a clamping wheel 24 is mounted at the output end of each motor, the jacked wheel can be clamped via the manipulator I 22, the waterproof motors 23 drive the clamping wheels 24 to rotate, and the wheel can be driven to rotate; the L-shaped tumbler II 25 is mounted at the output end of the servo motor II 9, the manipulator II 26 is mounted on the L-shaped tumbler II 25, the L-shaped tumbler I 21 and the L-shaped tumbler II 25 are same in structure, and the manipulator I 22 and the manipulator II 26 are same in structure. In the initial state, the manipulator I 22 is located above a feeding roller bed, and the manipulator II 26 is located in water. The servo motor I 8 drives the L-shaped tumbler I 21 to rotate 180°, the wheel clamped by the manipulator I 22 can be immersed into water, thus, the wheel enters the water, meanwhile, the servo motor II 9 drives the L-shaped tumbler II 25 to rotate 180°, the wheel clamped by the manipulator II 26 can be switched to a position above a discharging roller bed, thus, the wheel comes out of the water. The servo motor 3 drives the rotating disk 7 to rotate 180°, the wheel clamped by the manipulator I 22 is switched from a left cleaning station to a right cleaning station to realize secondary cleaning, and after the manipulator II 26 releases the wheel on the discharging roller bed, the wheel is switched from a discharging station to a feeding station, so that ordered engagement of discharging and feeding is realized. When the wheel is cleaned at the left cleaning station and the right cleaning station, the waterproof motors 23 drive the clamping wheels 24 to rotate, so that the wheel can rotate all the time, wherein the wheel rotating directions at the left cleaning station and the right cleaning station can be set to be opposite. This is the wheel cleaning system, which completes the entry of the wheel into water, the cleaning of the wheel, the coming-out of the wheel of water and station switching.

The right support frame 27 is fixed on the right side of the frame 1, the jacking cylinder II 28 is mounted on the right support frame 27, the jacking cylinder II 28 controls the up and down movements of the support platform 29 under the guidance of a guide post, the lifting round table II 31 is mounted on the support platform 29, the lower air compressor 30 is mounted below the lifting round table II 31, the output end of the lower air compressor 30 is connected with an air flue arranged on the lifting round table II 31, and air is blown to the back cavity of the wheel via the air outlet on the upper surface of the lifting round table II 31. The air outlet 33 is arranged above the discharging roller bed, and the upper air compressor 32 provides compressed air for the air outlet 33 to blow the front of the wheel. When the wheel clamped by the manipulator is switched to the position above the discharging roller bed, the upper air compressor 32 and the lower air compressor 30 work simultaneously to blow the front and the back cavity of the wheel respectively, next, the jacking cylinder II 28 drives the lifting round table II 31 to ascend, when the lifting round table II 31 is in contact with the flange face of the wheel, the manipulator releases the wheel, the wheel falls onto the lifting round table II 31, then the jacking cylinder II 28 drives the lifting round table II 31 to descend, the wheel falls onto the discharging roller bed, and the roller bed rotates to transfer the wheel down. This is the wheel discharging and blowing system, which blows and transfers the cleaned wheel.

Cleaning and blowing of each wheel comprise four steps: step 1, feeding and clamping; step 2, primary cleaning; step 3, secondary cleaning; and step 4, blowing and discharging.

The working process of the immersed wheel cleaning device is: in the initial state, the manipulator I 22 is located above the feeding roller bed, and the manipulator II 26 is located in water. Firstly, the wheel is positioned on the feeding roller bed by the positioning wheels 18, then the positioning wheels 18 are reset, the jacking cylinder I 11 drives the lifting round table I 13 to ascend to jack the wheel up certain height, the ascending wheel is clamped by the manipulator I 22, and after the wheel is clamped by the manipulator, the lifting round table I 13 descends and is reset, and this is step 1. Next, the servo motor I 8 drives the L-shaped tumbler I 21 to rotate 180°, the wheel clamped by the manipulator I 22 is immersed into water and cleaned, the waterproof motors 23 drive the wheel to rotate all the time during cleaning, meanwhile, the servo motor II 9 drives the L-shaped tumbler II 25 to rotate 180°, the unloaded manipulator II 26 is switched to a position above the discharging roller bed, and this is step 2. Then, the servo motor 3 drives the rotating disk 7 to rotate 180°, the wheel clamped by the manipulator I 22 is switched from the left cleaning station to the right cleaning station to accept secondary cleaning, the manipulator II 26 is switched from the discharging station to the feeding station to clamp next wheel to be cleaned, and this is step 3. Next, the servo motor I 8 drives the L-shaped tumbler I 21 to rotate 180° again, the wheel clamped by the manipulator I 22 is switched to a position above the discharging roller bed, blown and discharged, the waterproof motors 23 drive the wheel to rotate all the time during blowing, meanwhile, the servo motor II 9 drives the L-shaped tumbler II 25 to rotate 180° again, the to-be-cleaned wheel clamped by the manipulator II 26 is immersed into water and cleaned, and this is step 4. So far, cleaning and blowing of the first wheel are completed via the four steps, the second wheel also completes step 1 and step 2, and the device enters a stable full-load circulating state; ordered engagement of discharging and feeding is realized by cyclic switching of the manipulators; the steps are engaged, so that the cycle time is greatly reduced; and although cleaning and blowing of each wheel comprise four steps, when the device works continuously, the cycle time is just the sum of feeding and discharging time.

The device can be used for automatic continuous production; the wheel is immersed into water for cleaning in all directions, and the wheel rotates all the time during cleaning, so that the wheel is cleaned more uniformly, secondary cleaning of the wheel is realized, the cleaning time is prolonged, the cleaning quality is improved, the cycle time is shortened, and the production efficiency is improved; and the device is novel in structure and skilful in design, and guarantees the quality and the efficiency.

The invention claimed is:

1. An immersed wheel cleaning device, comprising a frame, a sleeve, a bearing seat, a shaft, a bearing, a rotating disk, a first servo motor, a second servo motor, a third servo motor, a left support frame, a first jacking cylinder, a guide post, a first lifting round table, a positioning support plate, a guide rail, a gear rack, a left sliding plate, positioning wheels, a clamping cylinder, a right sliding plate, a first L-shaped tumbler, a first manipulator, waterproof motors, clamping wheels, a second L-shaped tumbler, a second manipulator, a right support frame, a second jacking cylinder, a support platform, a lower air compressor, a second lifting round table, an upper air compressor and an air outlet;

wherein the sleeve is fixed in a center of a bottom of the frame, and the sleeve and the frame form an annular closed space which is filled with water for cleaning a wheel; the third servo motor is mounted inside the sleeve, the rotating disk is mounted at an output end of the third servo motor, and the third servo motor controls rotation of the rotating disk; the first servo motor and the second servo motor are symmetrically mounted on the rotating disk, the first L-shaped tumbler is mounted at an output end of the first servo motor, the first manipulator is mounted on the first L-shaped tumbler, the second L-shaped tumbler is mounted at an output end of the second servo motor, the second manipulator is mounted on the second L-shaped tumbler, the first L-shaped tumbler and the second L-shaped tumbler are same in structure, the first manipulator and the second manipulator are same in structure, and the first L-shaped tumbler and the second L-shaped tumbler are centrosymmetric.

2. The immersed wheel cleaning device according to claim 1, wherein in an initial state, the first manipulator is located above a feeding roller bed, and the second manipulator is located in the water; the first servo motor drives the first L-shaped tumbler to rotate 180°, the wheel clamped by the first manipulator is immersed into the water, thus, the wheel enters the water, meanwhile, the second servo motor drives the second L-shaped tumbler to rotate 180°, the wheel clamped by the second manipulator is switched to a position above a discharging roller bed, thus, the wheel comes out of the water; the third servo motor drives the rotating disk to rotate 180°, the wheel clamped by the first manipulator is switched from a left cleaning station to a right cleaning station to realize secondary cleaning, and after the second manipulator releases the wheel on the discharging roller bed, the wheel is switched from a discharging station to a feeding station, so that ordered engagement of discharging and feeding is realized.

* * * * *